(12) United States Patent
Lee

(10) Patent No.: US 7,210,967 B1
(45) Date of Patent: May 1, 2007

(54) CARD ADAPTER STRUCTURE

(76) Inventor: Yun-Hsiu Lee, 15F., No. 88, Msing-De Rd., San Chung, Taipei Hsien (TW)

( * ) Notice: Subject to any disclaimer, the term of this patent is extended or adjusted under 35 U.S.C. 154(b) by 0 days.

(21) Appl. No.: 11/488,683

(22) Filed: Jul. 19, 2006

(51) Int. Cl.
H01R 24/00 (2006.01)
(52) U.S. Cl. .................. 439/630; 439/945; 439/946
(58) Field of Classification Search ........... 439/630, 439/638, 945, 946
See application file for complete search history.

(56) References Cited

U.S. PATENT DOCUMENTS

| 7,033,223 | B1* | 4/2006 | Lin | 439/630 |
| 7,052,295 | B1* | 5/2006 | Lin | 439/159 |
| 2004/0229511 | A1* | 11/2004 | Chen | 439/638 |
| 2006/0014434 | A1* | 1/2006 | Yamamoto et al. | 439/630 |
| 2006/0166559 | A1* | 7/2006 | Nakai et al. | 439/630 |

* cited by examiner

Primary Examiner—Tho D. Ta
(74) Attorney, Agent, or Firm—Troxell Law Office, PLLC

(57) ABSTRACT

A card adapter structure includes an upper cover, a lower cover and a set of converter terminals. The upper cover designed to conform to short memory card (Mini SD) specifications, has an insertion slot defined at the rear of upper cover corresponding to a micro memory card (Micro SD). A plurality of grooves are defined on a bottom surface of the upper cover. A port is configured in a central portion of the lower cover to accommodate a micro memory card (Micro SD). Moreover, protruding pieces corresponding to the grooves of the upper cover are located on the lower cover forming a solid structural configuration. The converter terminals are fixed by embedding molding means and extend outward to contact cards. The structural configuration enables converting a micro memory card into a short memory card to facilitate inserting into a digital product provided with a short memory card circuit port.

3 Claims, 5 Drawing Sheets

CARD ADAPTER STRUCTURE

BACKGROUND OF THE INVENTION (a) Field of the Invention

The present invention relates to a card adapter structure, and more particularly to a card adapter that uses an assembled configuration including an upper cover, a lower cover and a set of converter terminals to enable converting a micro memory card of relatively small size into a short memory card of relatively larger size to facilitate inserting into a digital product provided with a short memory card circuit port for use thereof. Hence, the present invention has the effectiveness of providing a structure that can be simply and quickly assembled, enables solid emplacement of component members, saves on costs, reduces thickness of the entire configuration and is convenient to use, and is applicable for use in a variety of card adaptor structures or similar structures.

(b) Description of the Prior Art

The current popularity of 3C (computer, communications and consumer electronics) digital products, such as digital cameras, PDAs (personal digital assistants), MP3 (media player) personal stereos, have driven the vigorous development of flash memory cards and the derivation of a variety of memory cards having different size, form and specifications. The current most common memory card specifications include SM (Smart Media), xD-Picture Card, CF (Compact Flash), MD (Micro Drive), MS (Memory Stick) and SD (Secure Digital), MMC (Multi Media Card). However, with the increasing miniaturization of 3C digital products, manufacturers have released mini memory cards having substantially smaller size specifications, including the MS and MS PRO (Memory Stick PRO) extended Duo series, and the extended miniSD, RS-MMC (Reduced Size Multi Media Card) and Transflash derived from the SD and MMC specifications. The Transflash card, however, is still the smallest memory card in the current market, and the MS and MS PRO camps are actively promoting a micro memory card (Memory Stick Micro, M2) similar to that of the Transflash card. Nevertheless, continuous miniaturization of memory cards occupies a small area of the core market, and size of each type of memory card having different structural form and specifications differs or configuration of circuit port contact points varies.

Referring to FIG. 1, which shows a circuit port of a current micro memory card (Micro SD) a provided with eight gold contact points a1 and a circuit port of a short memory card (Mini SD) b configured with eleven gold contact points b1, three more than the micro memory card (Micro SD), wherein a tenth and an eleventh gold contact point b1 of the short memory card (Mini SD) b are temporarily non-functional, and a third and sixth gold contact point b1 of the short memory card (Mini SD) b are configured with the same function. Hence, the inventor of the present invention having accumulated years of experience in related arts, attentively and circumspectly carried out extensive study and exploration to ultimately design a new improved card adapter structure that facilitates converting the relatively small sized micro memory card (Micro SD) into a relatively larger sized short memory card (Mini SD) to facilitate inserting into a digital product provided with a short memory card (Mini SD) circuit port for use thereof.

SUMMARY OF THE INVENTION

A primary objective of the present invention is to provide a card adapter structure that uses a structural assembly of an upper cover, a lower cover and a set of converter terminals to enable converting a micro memory card of relatively small size into a short memory card of relatively larger size, thereby facilitating inserting into a digital product provided with a short memory card circuit port for use thereof, thus achieving the effectiveness to provide a structure that can be simply and quickly assembled, enables solid emplacement of component members, saves on costs, reduces thickness of the entire configuration and is convenient to use, and substantially improving practicability and convenience of the entire configuration.

Another objective of the present invention is to provide the card adapter structure with a structural configuration that enables a plurality of protruding pieces of the lower cover to mutually combine with a corresponding plurality of grooves of the upper cover, thereby firmly joining the upper cover to the lower cover, and increasing practicability of the entire configuration.

Yet another objective of the present invention is to provide the card adapter structure with a structural configuration wherein each terminal of a set of converter terminals supersedes gold contact points of the traditional circuit board, thereby reducing quality control problems caused by multi-operation assembly, and providing a substantial saving on costs.

Yet another objective of the present invention is to provide the card adapter structure with a structural configuration that enables the upper cover to cover and be disposed within the lower cover, thereby reducing thickness of the card adapter and increasing practicability of the entire configuration.

In order to achieve the aforementioned objectives, the card adapter structure of the present invention comprises an upper cover, a lower cover and a set of converter terminals. The upper cover has an external form designed to conform to short memory card (Mini SD) specifications, and an insertion slot is defined at a rear end of the upper cover corresponding to the shape of a micro memory card (Micro SD). Moreover, a plurality of grooves are defined on a bottom surface of the upper cover. The lower cover has an external form designed to conform to short memory card (Mini SD) specifications, and a short memory card (Mini SD) opening is defined at a front end of the lower cover. A port is configured in a central portion of the lower cover to accommodate a micro memory card (Micro SD), and a plurality of protruding pieces are located on the lower cover corresponding to the plurality of grooves defined on the upper cover, thereby enabling the upper cover to be joined to the lower cover to form a solid structural configuration therewith. The set of converter terminals is configured with eleven terminals, which are singly fixed within a fixed seating by embedding molding means. Eleven electrical contact points extend outward towards the short memory card (Mini SD) opening, and eight electrical contact points extend outward towards the micro memory card (Micro SD) port. Such a structural configuration enables converting a micro memory card of relatively small size into a short memory card of relatively larger size to facilitate inserting into a digital product provided with a short memory card circuit port. Hence, the present invention has the effectiveness of providing a structure that can be simply and quickly assembled, enables solid emplacement of component members, saves on costs, reduces thickness of the entire configuration and is convenient to use, which increase practicability, facilitation and safety of the entire structural configuration.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
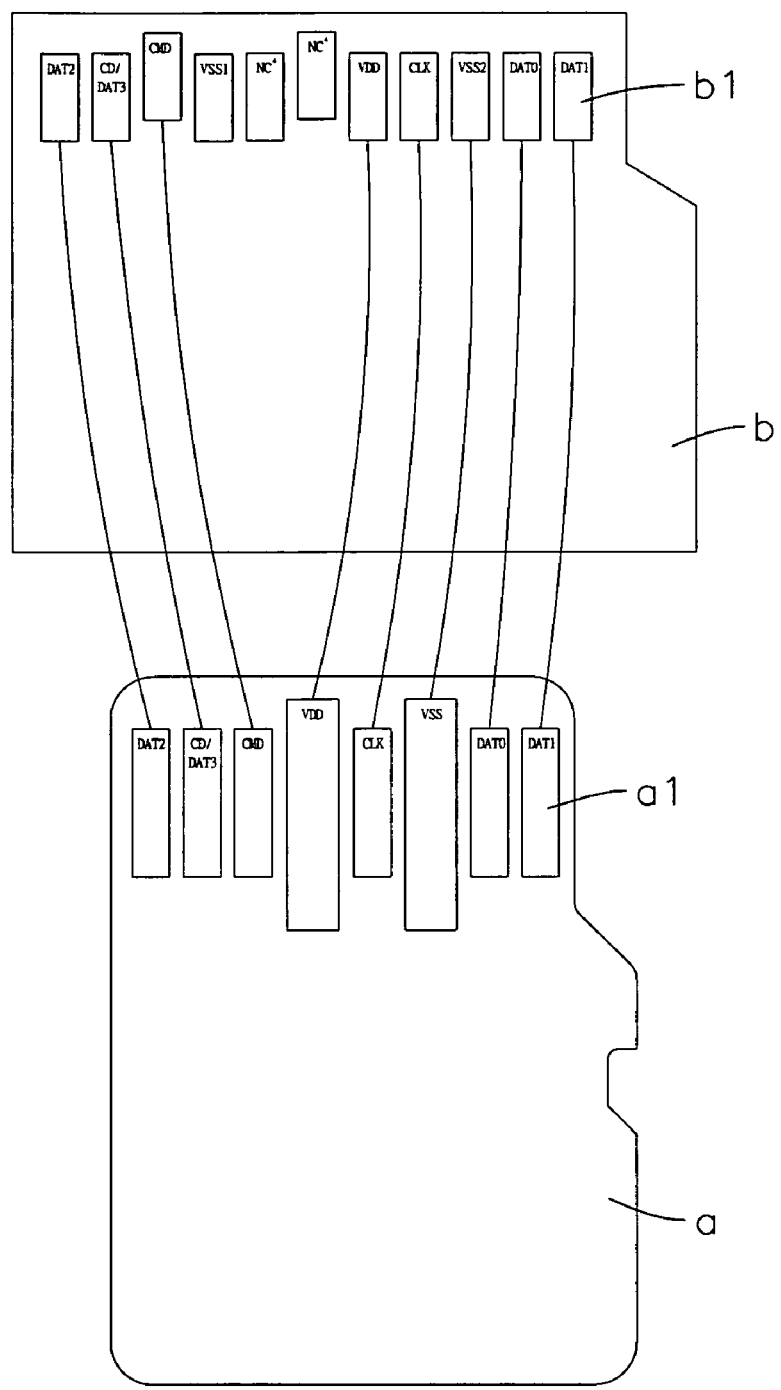
FIG. 1 shows a schematic view depicting electrical connections between a micro memory card (Micro SD) and a short memory card (Mini SD) of prior art.
Figure 2:
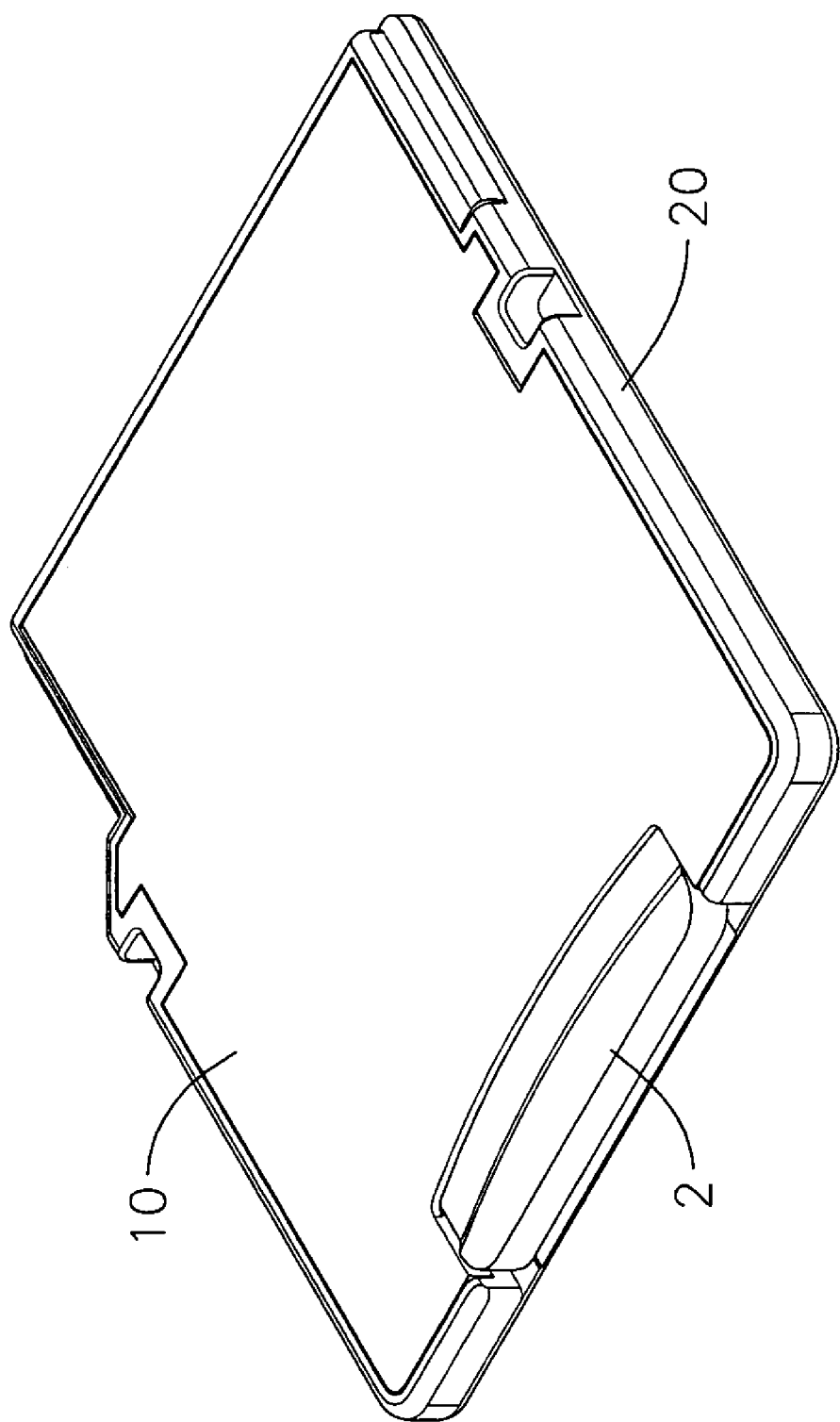
FIG. 2 shows an elevational view of an embodiment according to the present invention.
Figure 3:
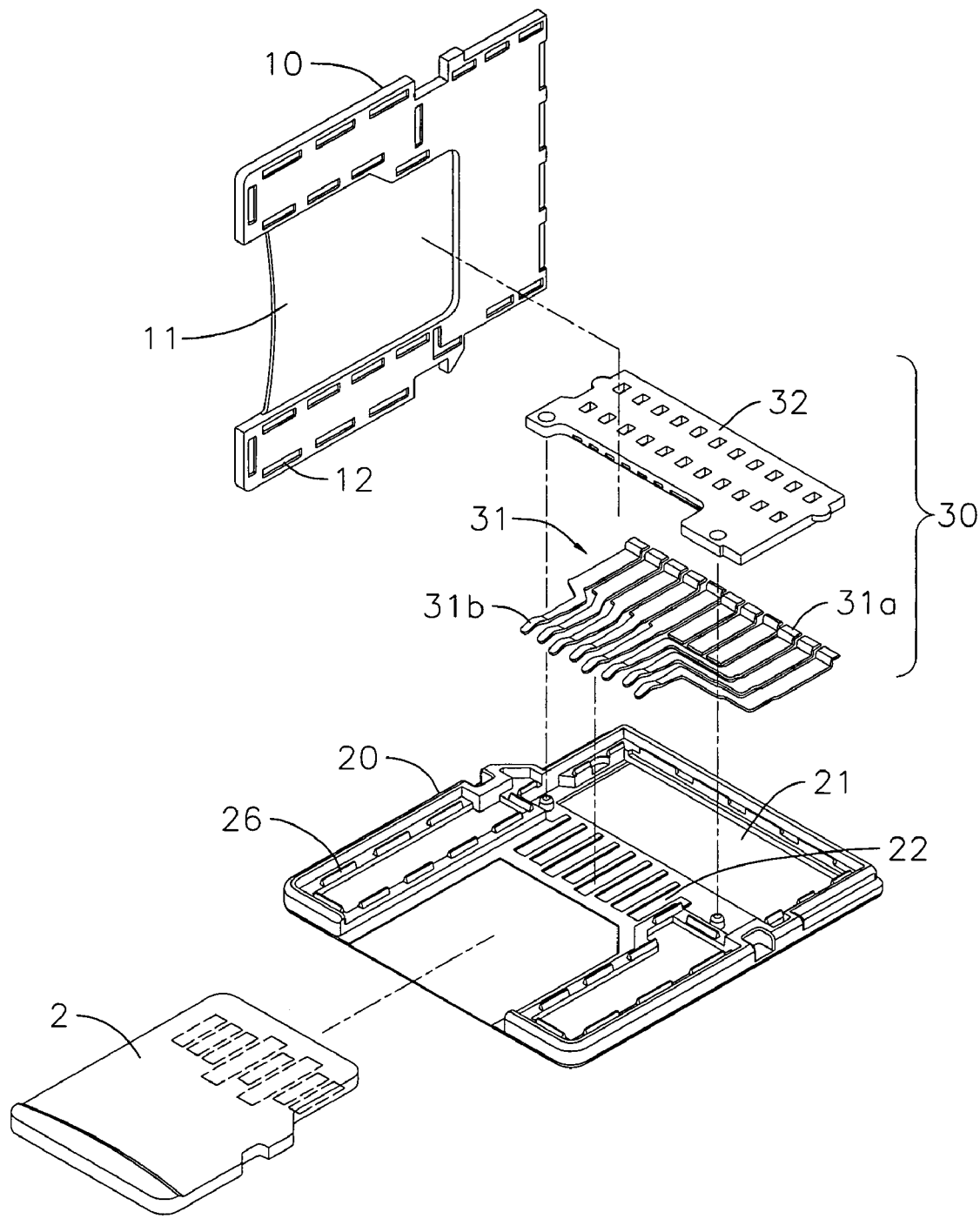
FIG. 3 shows an exploded elevational view of the embodiment according to the present invention.
Figure 4:
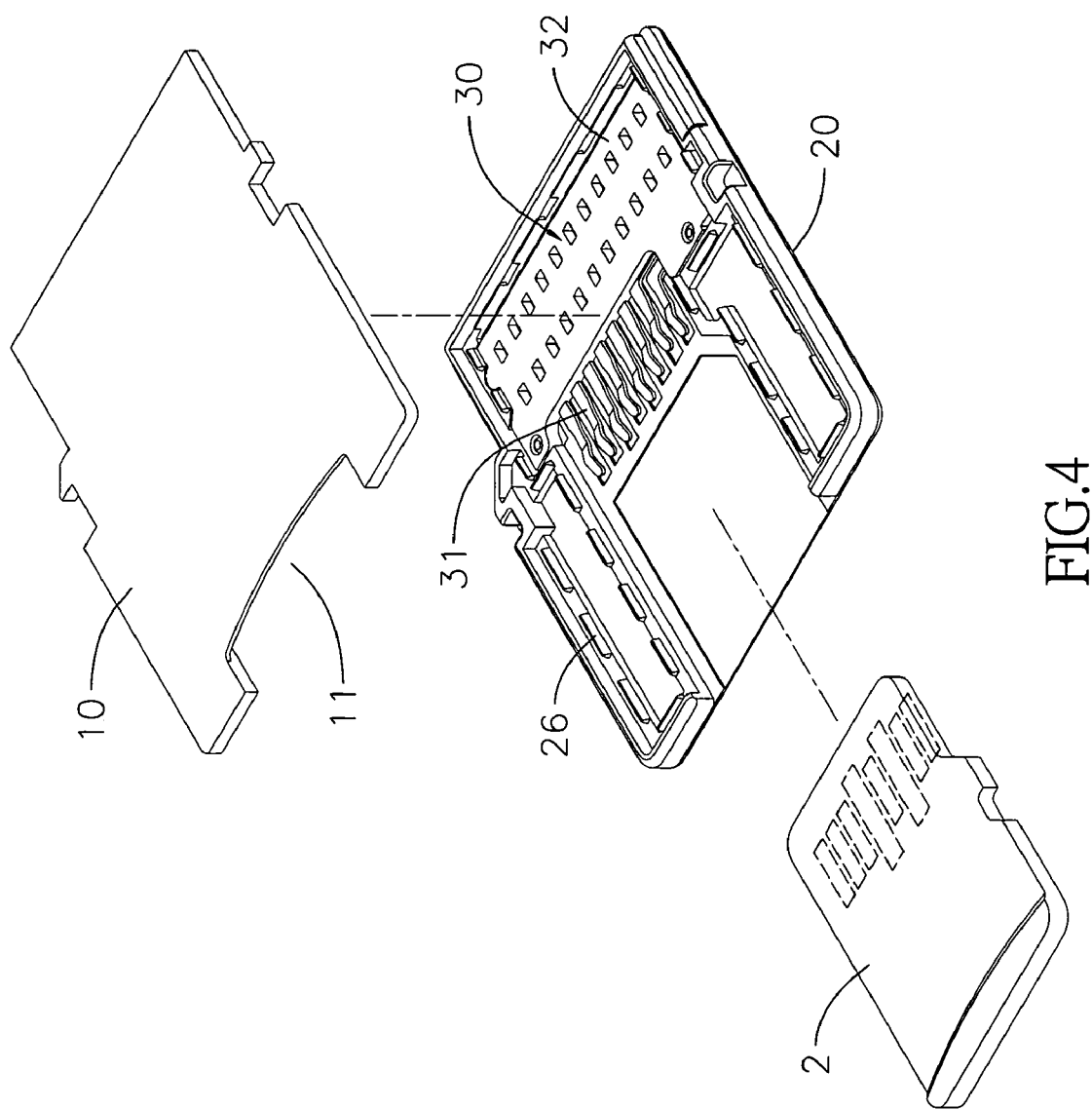
FIG. 4 shows a schematic view of the embodiment being combined with a micro memory card (Micro SD) according to the present invention.
Figure 5:
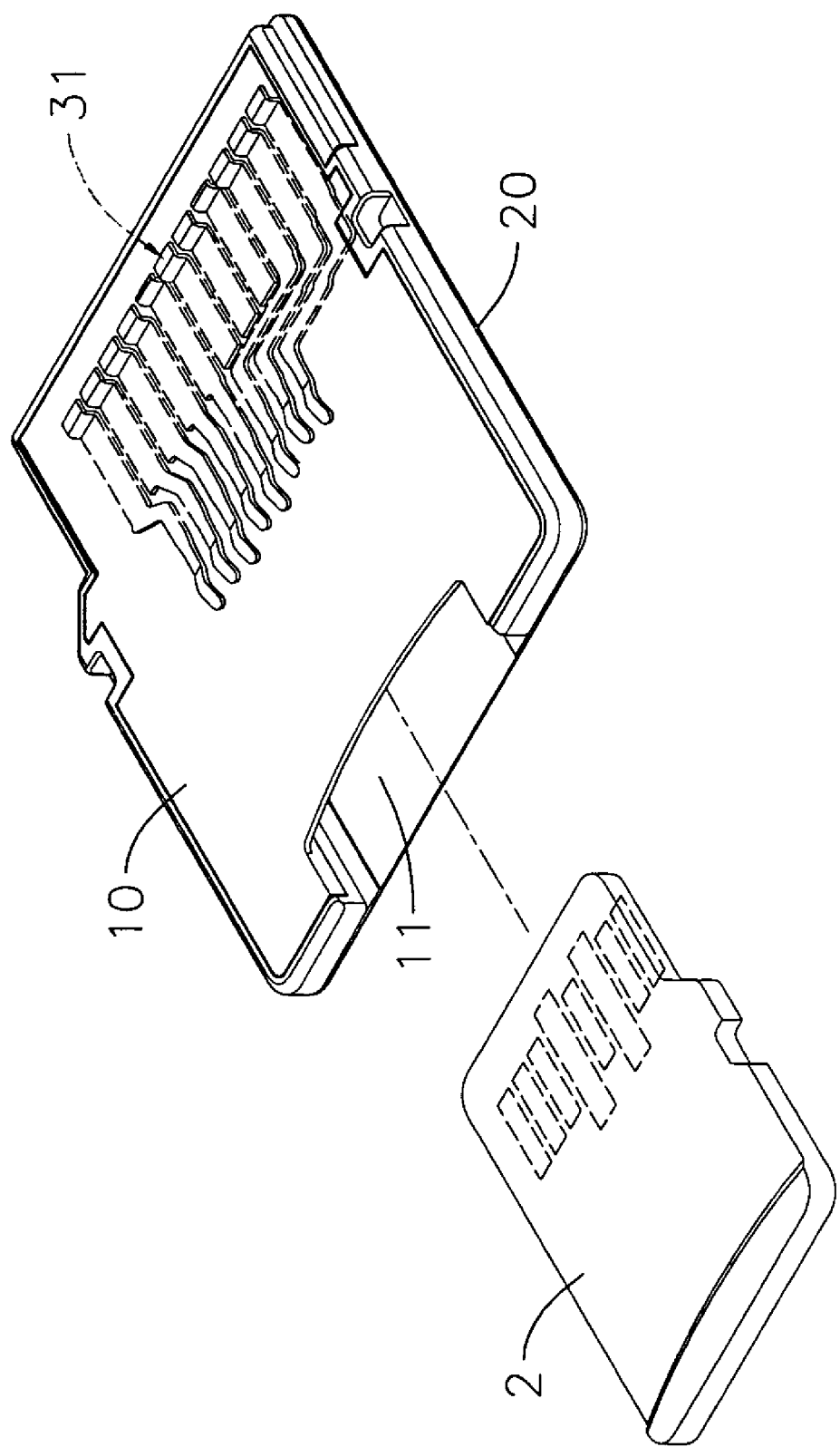
FIG. 5 shows a schematic view of the embodiment in use according to the present invention.

Referring to FIGS. 2, 3, 4 and 5, which show a card adapter structure of the present invention comprising:

An upper cover 10 having an external form designed to conform to short memory card (Mini SD) specifications, and an insertion slot 11 is defined at a rear end of the upper cover 10 corresponding to the shape of a micro memory card (Micro SD) 2, and a plurality of grooves 12 are defined on a bottom surface of the upper cover 10.

A lower cover 20 having an external form designed to conform to short memory card (Mini SD) specifications, and an opening 21 is defined in a front end of the lower cover 20, and a port 22 is configured in a central portion of the lower cover 20 to accommodate a micro memory card (Micro SD). A plurality of protruding pieces 26 are located on the lower cover 20 corresponding to the plurality of grooves 12 defined on the upper cover 10, thereby enabling the upper cover 10 to be joined to the lower cover 20 to form a solid structural configuration therewith. Moreover, the upper cover 10 covers and is disposed within the lower cover 20, thereby reducing thickness of the card adapter.

A set of converter terminals 30 configured with eleven terminals 31, which are singly fixed within a fixed seating 32 by embedding molding means. Eleven electrical contact points 31a extend outward towards the short memory card (Mini SD) opening 21, and eight electrical contact points 31b extend outward towards the micro memory card (Micro SD) port 22.

According to the aforementioned structural configuration of the card adapter structure of the present invention, as depicted in FIGS. 2, 3, 4 and 5, the present invention is characterized in that structural assembly of the upper cover 10, the lower cover 20 and the set of converter terminals 30 enables the plurality of protruding pieces 26 of the lower cover 20 to mutually combine with the corresponding plurality of grooves 12 of the upper cover 10 to form a firm structural configuration therewith. Moreover, each of the terminals 31 of the set of converter terminals 30 supersedes the gold contact points of a traditional circuit board, thereby reducing quality control problems caused by multi-operation assembly, and providing a substantial saving on costs. Furthermore, the eleven terminals 31 installed in the set of converter terminals 30 singly fixed within the fixed seating 32 by embedding molding means, the eleven electrical contact points 31a extending outward towards the short memory card (Mini SD) opening 21 and the eight electrical contact points 31b extending outwards toward the micro memory card (Micro SD) port 22 enable achieving converting the micro memory card (Micro SD) of relatively small size into the short memory card (Mini SD) of relatively larger size to facilitate inserting into a digital product provided with a short memory card (Mini SD) circuit port for use thereof. Hence, the present invention has the effectiveness of providing a structure that can be simply and quickly assembled, enables solid emplacement of component members, saves on costs, reduces thickness of the entire configuration and is convenient to use, thereby increasing practicability, facilitation and safety of the entire structural configuration.

According to the aforementioned detailed description, persons familiar with related art are able to easily understand that the present invention can clearly achieve the aforementioned objectives, and evidently complies with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A card adaptor structure enabling a micro memory card (Micro SD) to be used with a short memory card (Mini SD) circuit port of a digital product, the card adaptor structure comprising:
    a) an upper cover having:
        i) an insertion slot located in a rear end thereof, the micro memory card (Micro SD) is selectively inserted into the insertion slot; and
        ii) a plurality of grooves located on a bottom surface thereof;
    b) a lower cover connected with the upper cover and having:
        i) a lower cover opening located in a front end thereof;
        ii) a port located in a central portion thereof; and
        iii) a plurality of protruding pieces located on an upper surface thereof, one of the plurality of protruding pieces is inserted into each of the plurality of grooves;
        iv) a fixing seat located on the upper surface of the lower cover and covering the lower cover opening; and
    c) a set of converter terminals having:
        i) eleven terminals fixed in the fixing seat and having first eleven contact points located in the lower cover opening and eight second contact points extending from eight of the eleven terminals and toward the insertion slot.

2. The card adaptor structure according to claim 1, wherein the upper cover is positioned in an interior of the lower cover.

3. The card adaptor structure according to claim 1, wherein, when the micro memory card (Micro SD) is inserted into the insertion slot, the eight second contact points engaging contacts of the micro memory card (Micro SD).

* * * * *